April 18, 1967  D. W. SCHROEDER  3,314,882
PROCESS AND APPARATUS FOR THE DESALINATION OF SALT WATER
Filed Dec. 28, 1964
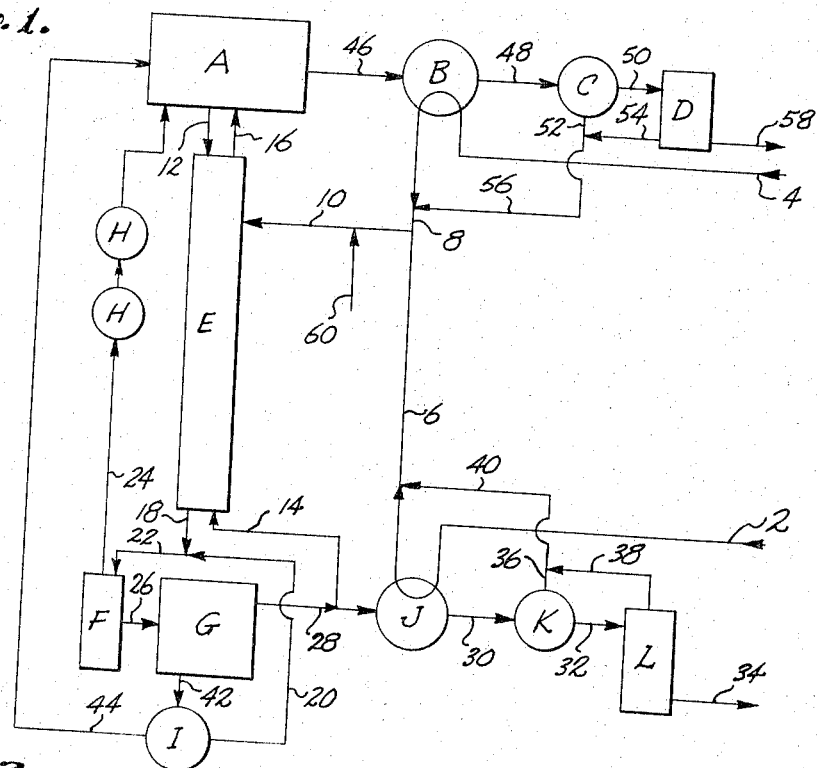
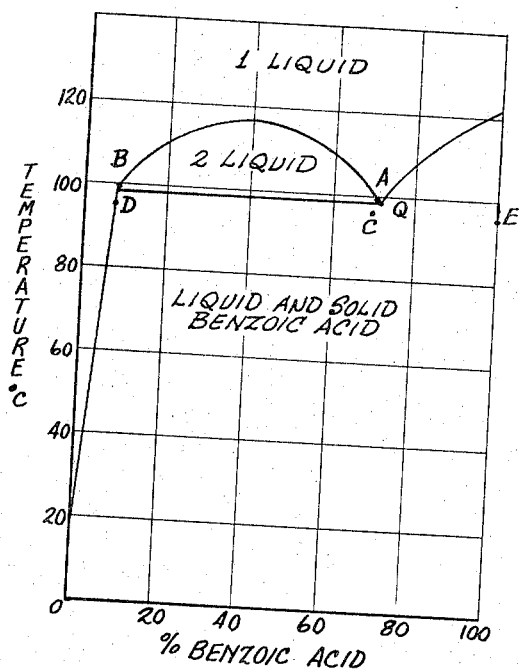
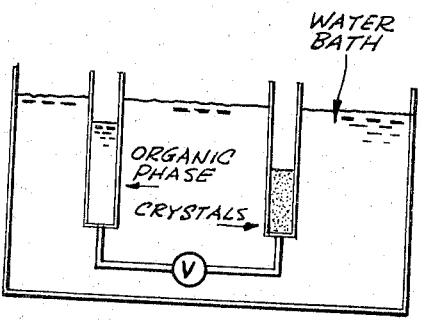
INVENTOR.
DAVID W. SCHROEDER
BY
Orland M. Christensen
ATTORNEY

United States Patent Office 3,314,882
Patented Apr. 18, 1967

3,314,882
PROCESS AND APPARATUS FOR THE
DESALINATION OF SALT WATER
David W. Schroeder, Seattle, Wash., assignor to Seattle
University, Seattle, Wash., a corporation of Washington
Filed Dec. 28, 1964, Ser. No. 421,203
18 Claims. (Cl. 210—59)

This application is a continuation-in-part of my copending application 159,147 which was filed Dec. 13, 1961, for a "Process of Producing Fresh Water" and which is now abandoned.

The invention herein described relates to the desalination of salt water and is particularly concerned with a process and apparatus for the desalination of salt water using solvent extraction techniques.

The principal object of the invention is to provide an economical solvent extraction process for the desalination of salt water. Another object is to develop a group of solvent extraction compounds which are readily recoverable from the extract for reuse, if desired, on a continuous basis. Still another is to develop techniques for recovering and reusing the solvents in the most expeditious manner. Other objects include developing techniques and apparatus which employ means such as a heat pump for preserving and carrying over the process heat from one stage to another so that the heat can be reused on a continuous basis. Still others include developing techniques and apparatus which enable me to avoid costly distillation procedures for recovering the solvent and to protect the extraction system from the introduction of contaminates. Additional objects will appear from the description following wherein I first describe certain of the invention's broader features and advantages before I provide several examples of my presently preferred mode of practicing the same.

By way of background, it will be recalled that the solvent extraction process operates on the principle that the chemical potential of a solute changes upon the addition of another solute to the solution. In the solvent extraction of water from salt water, the "solution" is the salt water, and the additional solute, the solvent extraction compound. In the extraction process, the two are contacted in liquid form and by countercurrent flow, and two products are drawn from the extractor, one of which is a more concentrated raffinate and the other is an extract containing water of low salinity. The solvent is thereafter recovered from the extract, thus leaving the water as a product.

Heretofore, the latter solvent recovery step has been carried out by distillation and other such high energy procedures. According to my invention, however, I use a group of organic solvents which provide me with an extract from which I can recover the solvent, and the fresh water product, by the simple procedure of first cooling the extract to produce a liquid water phase and a solid organic phase therein, and then displacing the water phase from the solid phase by means of a third phase which dissolves neither the water nor the solvent compound. This procedure is far more economical than any other within my knowledge, and in effect strips the recovery stage of any appreciable energy input whatsoever. It also makes it possible to shift the main energy input to the extraction stage and to fulfill this requirement in large part by heat which is released in the recovery stage, impounded, and transferred to the extraction stage for use there.

The third phase may be liquid, gaseous or vaporous and since it does not dissolve the water, may be separated from the same by gravity. Moreover, if desired, it may be recycled indefinitely through the displacement step.

The extract is one of a pair of conjugate solutions which are formed in the extraction process. According to the invention the organic compounds which I employ are solid at room temperature, are sparingly soluble in water and when added in greater than saturating amounts to the same at temperatures above their crystallization melting points in the water-organic system, they form a pair of liquid phases with the water of which one has a high concentration of the compound and the other has a low concentration of the same. Following the foregoing phenomenon of change in potential, the salts dissolved in the two phase system assume at equilibrium a higher concentration per unit volume of water in the low concentration organic solution than in the high concentration solution. Thus if the two solutions are directed countercurrent to one another by any one of the several conventional liquid liquid extraction techniques, a pair of products can be produced in one of which there is an increased salt concentration and in the other of which there is a depleted salt concentration. The former is the raffinate and the latter the extract.

It was my discovery, therefore, that having carried out the extraction step at a temperature above the crystallization point of the solvent in the water-organic system, it is possible to use this point as a means of recovering the solvent and the water product in the foregoing manner. To avoid the necessity for refrigeration and for handling large volumes of vapor, however, the solvent's crystallization point must be above room temperature. Based on the compounds I have examined to date, this requires that the solvent melt at a temperature of no less than about 50° C. and that it form the pair of conjugate solutions with salt water at a temperature of above about 20° C. In addition, it is obvious that the compound must also be stable at the temperatures needed to form the solutions and therefore cannot hydrolyze or react with the salts normally present in the water.

To date I have investigated the following compounds:

Benzoic acid
p-Phenylacetic acid
Hydrocinnamic acid
o-Toluic acid
p-Hydroxyacetophenone
Acetovanillone
2-ethyl-2-butyl-1,3-propanediol Benzoic acid and phenylacetic acid produce the best results and are therefore preferred.

I have also devised several ways of minimizing the energy expenditure in the continuous operation when using these compounds and others like them. If, for example, the extraction step is carried out at the minimum temperature above the solvent's crystallization point at which it will maintain its liquid condition, and the extract is cooled through only the difference between the two temperatures, then the temperature of the crystals need only be raised by a small amount, i.e. from as little as a fraction of a degree to two or three degrees, depending on the concentration selected for the brine, to melt them for purposes of making up new extracting medium. Furthermore I have also found that evaporation provides an excellent means for executing the cooling step inasmuch as the water evaporate provides a good medium in which to impound the heat from the cooling step for reuse in melting the solvent crystals. The impounded heat can be transferred to the crystals through a heat exchange medium or by direct contact with them in a suitable mixer. In either case it is necessary to raise the temperature of condensation to that necessary to melt the crystals. Because of the low energy input needed, I find it possible to use a heat pump for this purpose.

My preferred technique employs the so-called quadruple point characteristics of the aforedescribed group of compounds. It will be understood that because of heat of fusion requirements the excess solvent does not convert from liquid to solid until a certain quantum of heat has been removed from each unit of the same at the temperature of crystallization. Likewise, the temperature of the mixture as a whole cannot be lowered until the full measure of heat has been removed from each unit of the solvent. There is a lapse in temperature change, therefore, at the crystallization temperature, while the mixture passes through a slurry or slush stage as the molecules of liquid are converted one by one into solid crystals. (Compare this, for example, with conversion of water to ice at 0° C.; it will be recalled that roughly 80 calories of heat must be removed from each unit of water before the mass can be totally converted to ice.)

During this period, at the temperature of crystallization, the mixture exhibits four distinct phases, namely (1) a water vapor phase, (2) a solid organic phase, (3) a water rich liquid organic phase, and (4) a salt enriched salt water phase. The distinct presence of liquid water in the mixture follows from the fact that as each unit of liquid organic crystallizes, it releases a certain amount of liquid water. Given the necessary heat reduction, the whole of the excess will crystallize and release a proportionate amount of water. The water, however, is bound up, adsorbed on or occluded in the solid organic. According to my invention, therefore, I cool the extract only to the extent of solidifying part of the liquid organic so that the remainder is available as a means of displacing the liquid water phase from the solid organic phase. Of course, for the process to be continuous, it is necessary to crystallize an amount equal to the amount necessary to reseed the incoming supply water, which amount in turn is equal to the total of the fresh water and concentrated salt water products. I normally pursue this technique one step further, therefore, by carrying out the cooling step in the presence of a surplus of the liquid organic phase, as by recycling at least a portion of that separated after the displacement step, so that in effect all of the solvent in the extract is converted to the solid phase.

These features will be better understood by reference to the accompanying drawing wherein:

FIGURE 1 is a schematic illustration of an apparatus for carrying out the invention in accord with the quadruple point technique mentioned above;

FIGURE 2 is a modification of the apparatus with respect to the means employed to carry out the water displacement step; and FIGURE 3 is a graph illustrating the quadruple point system occurring in a mixture of salt water and one of my preferred solvent compounds, benzoic acid.

Referring to FIGURE 1, streams 2 and 4 represent sea water or other salt water feed streams. Two streams are employed for heat exchange purposes which will become apparent. After passing through heat exchangers B and J, the two streams form a pair of exit streams 6 and 8 which merge and form a single stream 10 that is fed into a packed extraction column E which is also fed with a high solvent salt solution 12 and a low solvent salt solution 14. In the extraction column a conventional liquid liquid extraction process occurs, the high solvent salt solution passing downward countercurrent to the ascending low solvent salt solution which continuously removes salt from the descending solution over a plurality of stages. Thus a low solvent high salt solution 16 exits from the top of the column and a high solvent low salt solution 18 exits from the bottom of the column. The solution or raffinate 16 is fed into a solvent mixer A for reasons which will be explained shortly. The solution or extract 18 is combined with a stream 20 of liquid organic phase and the combined streams 22 are fed into a flash crystallizer F where the cooling step occurs as water is evaporated off by the crystallization of a portion of the liquid solvent phase. The flash crystallizer is subjected to the suction side of a two stage heat pump H which continuously draws off the water vapor through conduit 24, compresses it and feeds it at a higher temperature of condensation into the mixer A.

As crystallization occurs each unit of the solid organic releases liquid water and this phase together with the liquid and solid organic phases are fed from the crystallizer to a settler G where the water separates from the organic medium by gravity and forms a distinct layer on top of the medium in the settler. This layer has a small percentage of dissolved solvent and is used in part as reflux to the extraction column for purposes of forming the low solvent salt solution 14 entering at the bottom of the same. The remainder is sent on through conduit 28 to the heat exchanger J where its heat is transferred to the incoming salt water stream 2. The cooled product 30 is then filtered in a filter K and its effluent 32 is sent on to a carbon adsorber L where the small percentage of solvent remaining is removed and the effluent becomes the fresh water product 34. The quantities of solvent removed in the filter K and the adsorber L are combined through conduits 36 and 38, and the total is added through conduit 40 to the hot salt water influent 6.

Returning to the settler G, it will be seen that the slurry of liquid and solid organic in the bottom of the settler is bled through conduit 42 into a drainer I from whence the filtrate is recycled to the flash crystallizer in the form of stream 20 and the solid organic is sent to the mixer A through conduit 44. In the mixer the steam from the heat pump H is condensed in contact with the solid organic from conduit 44 and the low solvent high salt solution from the top of the column. This in turn provides new high solvent extracting medium 12 to be passed downward through the column. The concentrated brine product 46 is passed through the heat exchanger B to transfer its heat to the salt water influent 4 and thence by conduits 48 and 50 through successive filtration and adsorption stages in the filter C and the carbon adsorber D. The quantities of solvent removed from these are combined through conduits 52 and 54, and the total is added through conduit 56 to the hot salt water influent 8. The brine leaving the adsorber through conduit 58 is one of the products of the plant.

Preferably the heat pump is driven by steam turbines and the exhaust steam from the same is injected into the inflow stream 10 at 60.

Other equipment such as a spray column, a Scheibel extractor, a rotary disk contactor, or a cascade of mixer-settlers can be substituted for the packed column. Likewise, other techniques than carbon adsorption are contemplated for the final solvent recovery stages.

Alternative techniques for carrying out the water displacement step include washing the solvent crystals with some other phase than the inborne liquid organic phase, such as a compressed air phase, or a different liquid solvent phase which is saturated with the inborne organic phase so that it dissolves neither the water nor the solid organic. Any third phase which can purge the surfaces of the solid phase and which dissolves neither the water nor the solvent can be used for this purpose, although it is apparent that my technique of using recycled liquid organic phase is particularly advantageous from the standpoint of a highly economical process.

FIGURE 2 illustrates an apparatus for carrying out certain alternative techniques. The wetted crystals of solvent are collected in the right hand tube and are washed with liquid organic phase from the left hand tube. As the liquid organic washes over them, the liquid water occluded in the crystals is floated out ahead of the organic so as to form a distinct top layer which can be readily removed from its surface. Alternatively, an air stream can be passed through the tubes from left to right, to float the water out on an air column.

FIGURE 3 aids in understanding the physical mechanics of the operation by illustrating the benzoic acid system. The extract is at point A in contact with the aqueous liquid of composition B. Upon cooling the mixture of composition A to point C just below the incidence of quadruple point characteristics, point Q, there is a separation into pure benzoic acid at point E and the aqueous product at point D. Over 97% of the solvent benzoic acid can be thus recovered as a solid upon cooling the extract a fraction of degree in temperature. Virtually all of the remaining benzoic acid is recovered when the water product is cooled by heat exchange with the feed. A small fraction of 1% must be recovered by adsorption on charcoal.

In an example operation using benzoic acid as the solvent compound it was found that it was necessary to feed and heat 1,445 gallons of sea water per 1,000 gallons of fresh water product in order to produce a product brine 3.3 times as concentrated as sea water by volume (3 times by weight). A two-stage heat pump was used to compress the steam from 13.65 p.s.i.a. to 16.15 p.s.i.a. A fourteen stage extractor and a reflux to fresh water product ratio of 0.6 were also used. The theoretical work of compression was 17.5 kw. hr. per 1,000 gallons of fresh water product. About 172 lbs. of high pressure steam were needed to drive the heat pump.

Benzoic acid has a particular advantage as an extraction medium in that it is non-toxic when converted to sodium benzoate, and in fact, is commonly used as a food preservative. Minute amounts of benzoic acid can readily be converted to sodium benzoate by addition of stoichiometric amounts of sodium hydroxide or sodium carbonate to the effluent stream.

The following examples demonstrate the efficacy of the aforedescribed group of compounds in carrying out the solvent extraction of fresh water from salt water. In each example, the numeral ratio of the volume of fresh water product to the volume of supply water is given as a percent. This figure can be compared with the percent of salt extracted, in certain examples, to ascertain the salt reduction. For analytical purposes, benzene is used to separate the liquid water phase from the solid organic phase.

EXAMPLE I

A synthetic sea water solution of various salts in water was prepared for use as a source of salt-containing water by dissolving magnesium chloride ($MgCl_2 \cdot 6H_2O$), calcium chloride ($CaCl_2$), sodium chloride (NaCl), sodium bicarbonate ($NaHCO_3$), sodium carbonate ($Na_2CO_3$), potassium bromide (KBr), potassium chloride (KCl) and sodium sulfate ($Na_2SO_4$) in Seattle city tap water. The amounts of chemicals dissolved were chosen to provide the following concentrations of cations and anions, expressed as gram equivalents/liter of solution:

Cations:
| | Gm. eq./liter |
|---|---|
| Na+ | 0.4662 |
| Mg++ | 0.1067 |
| Ca++ | 0.0209 |
| K+ | 0.0098 |

Anions:
| Cl− | 0.5453 |
|---|---|
| $SO_4$= | 0.0562 |
| $HCO_3$− | 0.0016 |
| $CO_3$= | 0.0002 |
| Br− | 0.0008 |

The solution had a density of 1.025 grams per milliliter (ml.) and a pH of 8.30. This solution approximates the average composition of sea water.

EXAMPLE II

One hundred cubic centimeters (cc.) of the solution of Example I were mixed with 100 grams of benzoic acid and the mixture heated until two phases (conjugate solutions) formed. The hot mixture was stirred briefly and then allowed to stand in a separatory funnel until the two phases separated, the heavier benzoic acid phase settling to the bottom. The mixture was kept sufficiently heated during the stirring and settling steps to insure retention of two liquid phases.

The benzoic acid phase, containing absorbed water and some salt, was drawn off through the funnel and dissolved in warm benzene. The benzene caused a water layer to separate from the benzoic acid solution. The water layer had a volume of 17 cc.

The water layer was analyzed for chloride content by titration with silver nitrate ($AgHO_3$) solution. The chloride concentration was found to be only 16% of the chloride concentration of the water of Example I, (i.e., supply water).

Percent water extracted _____ 17
Percent salt extracted _____ 2.7

EXAMPLE III

A 0.047 N solution of sodium chloride (NaCl) was prepared. Twenty-five grams of solid benzoic acid were added to 25 cc. of the solution and the mixture heated with stirring to 98° C. A benzoic acid phase and raffinate formed, the benzoic acid phase having a volume of 31 cc. and the raffinate a volume of 17 cc. A volume of 23 cc. of the benzoic acid phase was removed and found to weigh 24.4 grams. This volume was dissolved in hot benzene, whereupon 6.5 cc. of a liquid water phase separated therefrom.

The liquid water phase was titrated with 0.0614 N silver nitrate solution and it was determined that each cc. of water required 0.23 cc. of the silver nitrate solution to precipitate the chloride ion as silver chloride.

The raffinate was titrated with 0.0615 N silver nitrate solution and found to require 1.35 cc. of the silver nitrate solution to precipitate the chloride as silver chloride from 1 cc. of the same. This shows that the raffinate contained 5.9 times as much sodium chloride as was contained in the liquid water phase, thus the percent salt extracted was 5.7% while the percent water extracted was 26%.

EXAMPLE IV

A 4.7 N solution of sodium chloride was prepared. A mixture of 6 cc. of this solution with 44 cc. of water and 50 grams of solid p-phenyl acetic acid was made and heated while stirring to 48°–50° C. Two conjugate solutions formed.

The solution rich in p-phenyl acetic acid settled to the bottom of the container and the raffinate rose to the top. The phases were separated, and 20 cc. of toluene added to the upper phase. Slightly more than 36 cc. of water separated out. The p-phenyl acetic acid phase (lower) was shaken with about 100 cc. of toluene which caused slightly more than 10 cc. of a liquid water to separate. The water separated from the raffinate was titrated with 0.0991 N silver nitrate and required 7.15 cc. of the silver nitrate solution per cc. of the same to precipitate the chloride as silver chloride.

The liquid water phase was similarly titrated with the same silver nitrate solution and required 1.16 cc. to precipitate the chloride.

The percent salt extracted was determined as well as the percent water extracted:

Percent water extracted _____ 20.5
Percent salt extracted _____ 4.3

EXAMPLE V

Three cc. of 4.7 N sodium chloride solution were mixed with 22 cc. of water and 25 grams of solid p-hydroxyacetophenone. The mixture formed two phases on heating to 57° C. Following separation of the phases each phase was treated with isopropyl ether to cause a separation of the water. The water from each phase was titrated with 0.0991 N silver nitrate and the extraction percentages determined as follows:

Percent water extracted ---------------------- 16
Percent salt extracted ----------------------- 14

EXAMPLE VI

Six cc. of 4.7 N sodium chloride solution were mixed and heated with 44 cc. of water and 50 grams of solid acetovanillone. Two phases formed at 86°–87° C. The lower organic phase yielded 2.5 cc. water which required 5.7 cc. of 0.0991 N silver nitrate solution to precipitate the chloride. Five cc. of the upper phase required 31 cc. of the same silver nitrate solution to precipitate the chloride.

The salt concentration in the water extracted was determined to be 38.5% of the salt concentration in the 1st water phase.

EXAMPLE VII

Twenty-five cc. of water were mixed with 25 grams of hydrocinnamic acid. The mixture was heated and formed two liquid phases at 46° C. The lower (organic) phase occupied a volume of 26 cc. while the upper phase occupied a volume of 23 cc. The organic phase yielded 2.05 cc. of water and therefore the percent of water extracted was 8.3%.

EXAMPLE VIII

Twenty-five cc. of water were mixed with 25 grams of 2-ethyl-2-butyl-1,3-propanediol. The mixture formed two liquid phases at 13.5° C. with the organic phase uppermost. The lower phase or raffinate had a volume of 20 cc. and the upper (organic) phase had a volume of 32 cc. The organic phase yielded 3.2 cc. of water when mixed with toluene and therefore the percent of water extracted was 12%.

EXAMPLE IX

Seven cc. of water were mixed with 7 grams of o-toluic acid. The mixture was heated and formed 2 liquid phases at 92° C. The lower (organic) phase had a volume of 7.3 cc. and the upper phase or raffinate had a volume of 5.7 cc. The organic phase contained 1.3 cc. of water and therefore the percent of water extracted was 19%.

The following additional examples refer to my particular technique of separating the liquid water phase from the solid organic phase by displacement.

EXAMPLE X

A sample of benzoic acid was crystallized from a two phase liquid mixture and divided into two parts. Some of part one was analyzed for water by dissolving it in benzene and measuring the separated water phase. The rest of part one was placed on a sintered glass filter and pressed to remove water. The product thus formed contained 6.5% water.

Part two was washed with a solution of carbon tetrachloride saturated with benzoic acid. This sample contained 3½% water.

EXAMPLE XI

Four hundred fifty-four grams of benzoic acid and 186 grams of water were melted together. The mixture was cooled by evaporating water under a slight vacuum. The solid was slightly crushed and filtered. It contained 15% water. After an oil wash it contained 4% water.

EXAMPLE XII

A mixture of benzoic acid and water was heated to 98° C. to form two phases. It was cooled with constant stirring to 90° C. The water was decanted and the remaining crystals filtered. The crystals contained 16% water. Some of the crystals were washed with Shell spray base (a commercial mixture of hydrocarbons) saturated with benzoic acid. Water was displaced and the washed crystals contained 2% water.

EXAMPLE XIII

Crystals of benzoic acid containing about 30% water were placed in the water bath of FIGURE 2 at about 100° C.

The crystals were rewetted with water and heated to 95° C. The valve was then opened and the liquid organic phase (also at 95° C.) was allowed to flow into the crystal bed. It washed the water out ahead of it into a separate layer which floated on the organic layer. The water layer was removed and the organic layer blown back off the crystals with air. The valve was closed. The crystals were found to have 6% moisture.

While I have described my invention with reference to certain examples of the presently preferred mode of practicing the same, it will be understood that many modifications and additions can be made in and thereto without departing from the spirit and scope of the invention as defined in the claims following.

I claim as my invention:

1. A process for the desalination of salt water using an organic solvent extraction compound for water which is sparingly soluble in the same and which forms a pair of conjugate solutions with salt water when added thereto in greater than a saturating amount at a temperature above the crystallization point of the compound in the resulting water-organic system, one of which solutions is relatively salt-depleted and organic-rich, and the other of which is relatively salt-rich and organic-depleted, comprising contacting the salt water with a greater than saturating amount of the compound, in a liquid-liquid extractor, at a temperature above the crystallization point of the compound in the water-organic system, so as to form the pair of conjugate solutions, separating the salt-depleted, organic-rich solution from the salt-rich organic-depleted solution, at a temperature above the crystallization point of the compound in the salt-depleted, organic-rich solution, so that the compound remains in a molten state in the latter solution at the point of separation, thereafter cooling the salt-depleted, organic-rich solution to at least the temperature of crystallization of the compound so as to form a liquid water phase and a solid organic phase therein, and displacing the liquid water phase from the solid organic phase with a third phase which is fluid and dissolves neither water nor the organic compound.

2. The process according to claim 1 wherein the organic compound is a solid which melts at no less than about 50° C. and which forms the pair of conjugate solutions with salt water when added thereto in greater than a saturating amount at a temperature above about 20° C.

3. A method according to claim 2 wherein the third phase is a liquid phase of the solvent extraction compound.

4. A method according to claim 2 wherein the salt-depleted, organic-rich solution is cooled to the temperature of crystallization of the compound, only to the extent of crystallizing less than the whole of the liquid organic phase therein so that the remaining liquid organic phase displaces the liquid water phase from the solid organic phase.

5. A method according to claim 2 wherein the third phase is gaseous.

6. A method according to claim 2 wherein the third phase is a liquid solvent other than the solvent extraction compound, which is saturated with the compound.

7. A method according to claim 2 wherein the cooling step is carried out by evaporating a portion of the water from the salt-depleted solution.

8. A process for continuously extracting fresh water from salt water using an organic solvent extraction compound for water which is sparingly soluble in the same and which forms a pair of conjugate solutions with salt water when added thereto in greater than a saturating amount at a temperature above the crystallization point of the compound in the resulting water-organic system, one of which solutions is relatively salt-depleted and organic-rich, and the other of which is relatively salt-rich and organic depleted, comprising contacting the salt water with a greater than saturating amount of the compound, in a liquid-liquid extractor, at a temperature above the crystallization point of the compound in the water-organic system, so as to form the pair of conjugate solutions, separating the salt-depleted, organic-rich solution from the salt-rich, organic depleted solution, at a temperature above the crystallization point of the compound in the salt-depleted, organic-rich solution, so that the compound remains in a molten state in the latter solution at the point of separation, thereafter cooling the salt-depleted, organic-rich solution to at least the temperature of crystallization of the compound so as to form a liquid water phase and a solid organic phase therein, displacing the liquid water phase from the solid organic phase with a third phase which is fluid and dissolves neither water nor the organic compound, removing a portion of the separated liquid water phase as the fresh water product, refluxing the remainder of the separated liquid water phase to the extractor to form the low organic solution therein, impounding the heat released in the cooling step in a vaporous medium, raising the temperature of condensation of the medium, remelting the solid organic phase with the heat of condensation from the medium, mixing the organic melt with a portion of the salt-rich organic depleted solution from the extractor, and refluxing the mix to the extractor to form the high organic solution therein.

9. The process according to claim 8 wherein the solid organic phase is remelted by direct contact with the vaporous medium in the salt-rich-organic-depleted solution.

10. A method according to claim 8 wherein the temperature of crystallization of the compound is above room temperature; the salt-depleted, organic-rich solution is cooled to the temperature of crystallization of the compound, only to the extent of crystallizing less than the whole of the liquid organic phase therein so that the remaining liquid organic phase displaces the liquid water phase from the solid organic phase; and the latter liquid organic phase is thereafter separated from the liquid water phase and recycled to the cooling step to form the displacing medium once again.

11. A method according to claim 8 wherein the temperature of crystallization of the compound is above room temperature and the cooling step is carried out by evaporating a portion of the water from the salt-depleted, organic-rich solution.

12. A method according to claim 11 wherein the water vapor released in the cooling step is impounded, compressed and condensed in direct contact with the solid organic phase to form the melt.

13. Apparatus for continuously extracting fresh water from salt water using an organic solvent extraction compound for water which is sparingly soluble in the same and which forms a pair of conjugate solutions with salt water when added thereto in greater than a saturating amount at a temperature above the crystallization point of the compound in the resulting water-organic system, one of which solution is a relatively salt-depleted and organic-rich extract and the other of which is a relatively salt-rich and organic-depleted raffinate, comprising a liquid-liquid extractor for contacting the salt water and compound at a temperature above the crystallization point of the latter in the water-organic system, and separating the mixture thereof into the salt-enriched, organic-depleted raffinate and the salt-depleted, organic-rich extract; a mixer which is connected with the extractor to reflux a portion of the raffinate thereto; means for cooling the extract to the crystallization point of the compound, so as to form a liquid water phase, a liquid organic phase, and a solid organic phase therein; means for separating the liquid water phase from the liquid and solid organic phases of the cooled extract, and refluxing a portion of the liquid water phase to the extractor; means for separating the liquid and solid organic phases from one another, and recycling the liquid organic phase to the extract cooling means and the solid organic phase to the mixer, for mixing with the portion of the raffinate which is refluxed; and means for impounding the heat which is released in the extract cooling means and transferring the same to the solid organic phase in an amount necessary to remelt the latter phase in said portion of the raffinate which is refluxed.

14. Apparatus according to claim 13 wherein the extract cooling means includes a flash crystallizer for evaporating a portion of the liquid water phase in the extract, and the heat impounding and transfer means includes a heat pump interconnected between the crystallizer and the mixer to pump the water vapor from the former to the latter at an increased temperature of condensation.

15. Apparatus according to claim 14 wherein the liquid water separator means includes a settler which is connected to the crystallizer to allow the liquid water and liquid organic phases to form into separate layers.

16. Apparatus for continuously extracting fresh water from salt water using an organic solvent extraction compound for water which is sparingly soluble in the same and which forms a pair of conjugate solutions with salt water when added thereto in a greater than saturating amount at a temperature above the crystallization point of the compound in the water-organic system, one of which solutions is a relatively salt-enriched, organic-depleted raffinate, and the other of which is a relatively salt-depleted, organic-enriched extract, comprising a liquid-liquid extractor for contacting the salt water and compound at said temperature, and separating the mixture thereof into the aforementioned raffinate and extract; a mixer which is connected with the extractor to reflux a portion of the raffinate thereto; means for cooling the extract to at least the temperature of crystallization of the compound, so as to form a liquid water phase and a solid organic phase therein; means for separating the liquid water phase from the solid organic phase of the cooled extract, and refluxing a portion of the liquid water phase to the extractor, and the solid organic phase to the mixer, for mixing with the portion of the raffinate which is refluxed; and means for impounding the heat which is released in the extract cooling means and transferring the same to the solid organic phase in an amount necessary to remelt the latter phase in said portion of the raffinate which is refluxed.

17. Apparatus according to claim 16 wherein the liquid water phase separator means includes means for washing the solid organic phase with a third phase which dissolves neither water nor the organic compound, and which floats the liquid water phase in a separate layer thereon.

18. Apparatus according to claim 17 wherein the extract cooling means includes a flash crystallizer for evaporating a portion of the liquid water phase in the extract, and the heat impounding and transfer means includes a heat pump interconnected between the crystallizer and the mixer to pump the water vapor from the former to the latter at an increased temperature of condensation.

References Cited by the Examiner

UNITED STATES PATENTS 2,976,224   3/1961   Gilliland _____ 203—10

MORRIS O. WOLK, *Primary Examiner.*

E. G. WHITBY, *Assistant Examiner.*